United States Patent Office 2,823,168
Patented Feb. 11, 1958

2,823,168

DEPILATORY OF THIOGLYCOLLATE SALT IN GEL SOLUTION WITH COLLOIDAL EXCESS AND METHOD OF PREPARING SAME

Albert A. Stonehill, Plainfield, N. J., assignor to Ethicon, Inc., a corporation of New Jersey No Drawing. Application June 6, 1952
Serial No. 292,183

6 Claims. (Cl. 167—89)

This invention relates to a method of preparing a depilatory and the product resulting therefrom. More specifically it relates to a depilatory for use prior to surgical interventions.

Earlier depilatory formulations contained combinations of various alkalis and hydrogen sulfide as active ingredients. Later the use of mercaptans in combination with alkaline reacting materials was found to be more suitable in that the objectionable odor which was present in those depilatories which contained hydrogen sulfide was eliminated to a large extent. The conventional method of preparing these formulations was to first combine the mercaptan with the alkaline reacting material in water and then add the salt formed to a mucilaginous or creamy base. Although the formulations of the prior art have achieved acceptance, it has been recognized that the various sulfur and alkaline compounds which are used to effect depiling have irritating effects on human skin and that it is therefore desirable that the minimum amount of such ingredients capable of effective depilation be present in the formulation. It has also been thought that the effectiveness of these depilatory formulations is dependent upon the amounts of the active ingredients that are in true solution. Any excess of such ingredients, beyond that which is actually in solution, will be present generally in the form of undissolved granules which have little or no depiling activity. Since solubility is markedly affected by temperature, at lower temperatures the amount of precipitated active ingredients is increased and depiling effectiveness is accordingly decreased. At 0° centigrade the solubility of calcium thioglycollate is approximately 1 gram per 100 cubic centimeters of water. A depilatory with this concentration of active ingredients is practically useless since it is recognized that a concentration of a minimum of about 3 percent is necessary for depilation. Further, storing the present formulations under adverse conditions, particularly low temperatures, will cause the precipitation out of solution of the active ingredients and in a number of instances, results in settling of the ingredients to the bottom of the container. To use these formulations after storing under such conditions, it is necessary to redistribute the active ingredients throughout the carrier or agent with which they are formulated. This is inconvenient in that it requires extensive shaking or stirring, and in some instances in practically impossible, particularly where the container is a collapsible tube.

By means of my invention, I am able to produce a depilatory which has greater depiling effectiveness and is less irritating than a depilatory formulated by the conventional method, despite the fact that lesser amounts of active ingredients are used. My depilatory contains, as the active ingredient, a compound of the formula

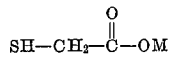

in which M is a metal selected from the class consisting of sodium, potassium, and calcium. The preferred active ingredient is calcium thioglycollate.

I am also able to produce a depilatory which will insure effective removal of body hair from skin areas at or adjacent to the site of surgical incision and maintaining those skin areas in an aseptic condition both before and after surgery. I am also able to obtain a depilatory formulation which can be stored under adverse conditions without loss of effectiveness.

I have found that such a depilatory can be formulated provided the excess of the active ingredients above that amount which is in true solution, is present in a colloidal, as distinguished from a crystalline form or state.

I have further found that an effective presurgery depilatory can be compounded by colloidally dispersing a bactericidal agent in the formulation.

To attain such a formulation, an aqueous gel compatible with the active ingredients is first prepared. Thioglycollic acid is then added and distributed thoroughly throughout the gel by stirring or other means. When adequate distribution has been obtained, an alkaline reacting compound is added in amounts in excess of that necessary to neutralize the mercaptan acid whereby the salt formed in excess of that which is capable of solution by the aqueous gel, is colloidally dispersed therein. To prepare a surgical depilatory, a bactericidal agent which has previously been dissolved in a suitable solvent is added to the depilatory formulation following the addition of the alkaline reacting material. By this manner of addition, the bactericide combines with the excess of the alkaline reacting compound and is also colloidally dispersed in the gel.

By way of illustration only, the following is an example of my method:

(In all instances, stirring was at a moderate rate.) Sixty-eight grams of water and 5.0 grams of sorbitol were heated to 90° centigrade in a suitable container. 2.25 grams of methyl cellulose was added with constant stirring. When the sorbitol and the methyl cellulose were thoroughly dispersed, the container was immersed in an ice bath and the contents were continuously stirred until the temperature dropped to 25° centigrade. A smooth transparent gel was obtained. To this gel 3.00 grams of thioglycollic acid was slowly added with continued stirring. Then a slurry of 3.20 grams of calcium hydroxide in 15 cubic centimeters of water was slowly added with continued stirring. A colloidal suspension was seen forming. The temperature of the reaction was not permitted to exceed 35° centigrade. The weight of the contents of the vessel was then adjusted to 100 grams by the addition of water.

To obtain a depilatory formulation with bactericidal properties, 0.50 gram of a polysubstituted halogenated diphenyl methane, such as 2,2'-dihydroxy-3,5,6-3',5',6'-hexachlorodiphenylmethane, was dissolved in 2.00 grams of an aryl alkyl polyether alcohol, such as p-diisobutyl-phenoxypolyethoxyethanol, and slowly added to the above formulation with stirring following the addition of the calcium hydroxide.

A more complete example of a depilatory that can be prepared by my method is as follows:

| | Grams |
|---|---|
| Methyl cellulose (4000 centipoises for 2 percent solution) | 2.25 |
| Thioglycollic acid | 3.00 |
| Calcium hydroxide | 3.20 |
| 2,2' - dihydroxy-3,5,6-3',5',6'-hexachlorodiphenyl-methane | 0.50 |
| p-Diisobutylphenoxypolyethoxyethanol | 2.00 |
| Perfume | 0.30 |
| Sorbitol | 5.00 |
| Water up to | 100.00 |

In accordance with this method, it is possible to obtain a depilatory wherein the amount of the active ingredients in excess of that which is in true solution will be colloidally dispersed throughout the gel and to obtain a depilatory which will render the depiled skin areas in an aseptic condition. The effectiveness of such a colloidal dispersion and its lack of irritation is amply illustrated by comparing it with a formulation which has been prepared by the conventional method of first forming a salt which has depiling activity and then adding the salt to a base or carrier material.

To determine the effectiveness of the depilatory prepared by my method, a preparation with a 4½ percent thioglycollic acid content was prepared by the conventional method of first forming a salt of thioglycollic acid and calcium hydroxide in water and then adding the slurry to an aqueous methyl cellulose gel. The same preparation containing a 3 percent thioglycollic acid content was formulated by my method. Under identical conditions, each of the two formulations was applied to approximately four square inches of the forearm of four humans. The skin areas to which the depilatory prepared by my method was applied were excellently depiled with no effects of irritation, while those skin areas to which the depilatory prepared by the conventional method was applied were substantially less depiled with more irritation. Additional tests were run on guineapigs, rabbits and rats with results consistent with those obtained where humans were involved.

It would seem apparent that since depiling activity is dependent upon the content of the active ingredients, i. e. the mercaptan and the alkali, an increasing concentration would increase the effectiveness of the depiling action and a corresponding decrease would decrease such action. However, as indicated above, when my method is followed, a lesser amount of such ingredients is, in fact, more effective in its depiling action and is less irritating than is a greater amount of the same ingredients in a formulaton prepared by the conventonal method.

In attempting to formulate a depilatory possessing bactericidal properties, it was found to be impossible to attain such an object by direct addition of the particular bactericidal agent used to the formulation in that an insoluble precipitate was formed by the bactericide and the alkaline reacting compound which was present in excess in the formulation. This insoluble precipitate was found to have no bactericidal action. Whereupon it was discovered that by adding a solution of the bactericidal agent, such as one wherein the solvent is p-diisobutylphenoxypolyethoxyethanol, a colloidal dispersion of the salt of the alkaline reacting compound and the bactericidal agent is obtained. Experiments with this depilatory conclusively established its effectiveness as one possessing bactericidal properties, in contradistinction to a depilatory wherein the bactericidal agent was added directly.

I have observed that to obtain a depilatory in accordance with the present invention adherence to certain general conditions attending the formulation is required. I have also observed that various modifications, substitutions, and variations may be made, particularly in the case of the ingredients used.

(1) The temperature of preparation must be carefully regulated. It must not exceed an upper limit above which the gels liquify and accordingly lose their colloidal forming properties. In the case of methyl cellulose, this upper limit is about 38° centigrade. Although it is possible to formulate the depilatory at a temperature as low as 0° centigrade and still obtain effective depiling action, I prefer a temperature of about 25° centigrade to carry out the formulation.

(2) The aqueous gel to which the active ingredients are added must be of water dispersible nonacid character since gels which are acidic are unstable at the pH range of 12–12.6, the preferred pH of the present invention. In addition there are members of the nonacidic gel group which do not retain their gel forming properties at high alkalinities. Accordingly, selection of the gel is predicated on its stability at high alkalinities. Other materals which form nonacid gels with water and which are stable at the alkalinities of the present invention, such as tragacanth, are also suitable as the base or carrier. While in our preferred method the base used is a 2 percent aqueous solution of that grade of methyl cellulose, a nonacidic cellulose ether, which will establish a viscosity of about 4000 centipioses, the other nonacid gel forming substances may be effectively substituted, preferably in such quantities as to form an aqueous gel of comparable viscosity. A range of from 2000 to 4000 centipoises at 20° C. is selected merely to represent that viscosity which is sufficient to give an adequate body to the finished product to prevent running. A less viscous preparation is also effective.

(3) Numerous alkaline reacting compounds are equally satisfactory for use in the preparation. While calcium hydroxide is preferred, I have found the hydroxides of potassium and sodium quite suitable. Sufficient excess alkali should be present in the formulation to give it a final pH of from about 12 to about 12.6. It is possible to use one alkali in amounts stoichiometrically equivalent to the amount of thioglycollic acid present and use another alkali to secure the desired pH. For example, calcium hydroxide can be added to the extent necessary to neutralize the thioglycollic acid, and potassium hydroxide or sodium hydroxide can then be added to the formulation to give it the desired pH. The addition of the alkaline reacting compound must be made subsequent to the addition of the thioglycollic acid. If the alkaline reacting compound is added first, the gel forming properties of the carrier or base material will be materially effected and will result in an undesirable product.

(4) In addition to 2, 2'-dihydroxy-3,5,6-3',5',6' hexachlorodiphenylmethane, which has been disclosed in the example formulation given above, other members of the class of polysubstituted halogenated diphenyl methanes, which are effective bactericidal agents, may be utilized. In any case, the bactericide selected must first be dissolved in a suitable solvent prior to its incorporation into the formulation. Direct addition of the bactericide alone will result in the formation of an ineffective salt, possessing no bactericidal properties.

(5) A number of solvents are suitable for dissolving the polysubstituted halogenated diphenyl methanes prior to their incorporation into the formulation. Liquid non-ionic surface active agents, such as p-diisobutylphenoxypolyethoxyethanol, an aryl alkyl polyether alcohol, have been found to be most suitable. Another class of surface depressants which are suitable are the liquid, non-ionic members of the polyoxyethylene sorbitans which are referred to in the trade as "Tweens." Cationic surface active agents are incompatible. Other organic solvents which have been tried and found effective are ethyl alcohol, propyl alcohol, butyl alcohol, amyl alcohol; ketones such as acetone, methyl ketone and diethyl ketone. It is important that in selecting a solvent, care must be taken to insure that the solvent does not possess the inherent capabilities of forming a compound with the bactericide which will produce irritation to the skin. For example, propylene glycol, which is an effective solvent for the bactericidal agent, is irritating to the skin, when combined with the bactericide, and accordingly not desirable.

The foregoing description is not to be taken as limiting my invention, but is only illustrative as many variations may be made without departing from the spirit and scope of the following claims.

I claim as my invention:

1. A depilatory formulation comprising a nonacid aqueous gel stable at high alkalinities, a compound of the formula

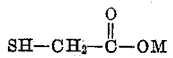

in which M is a metal selected from the class consisting of sodium, potassium and calcium, the compound being in excess of that in solution in the gel, the excess being colloidally dispersed therein, said formulation having a pH of from about 12 to about 12.6.

2. A depilatory formulation comprising a nonacid aqueous gel stable at high alkalinities, calcium thioglycollate in an amount in excess of that in solution in said gel, the excess being colloidally dispersed therein, said formulation having a pH of from about 12 to about 12.6.

3. A depilatory formulation according to claim 2 wherein the nonacid aqueous gel is a methyl cellulose gel.

4. The method of preparing a depilatory formulation comprising adding thioglycollic acid to a nonacid aqueous gel stable at high alkalinities, subsequently adding a compound selected from the class consisting of hydroxides and alkaline reacting compounds of sodium, potassium and calcium, whereby a colloidal salt is formed, said thioglycollic acid and said compound being added in quantities sufficient to provide an excess of said salt above that in solution and to provide said formulation with a pH of from about 12 to about 12.6.

5. The method according to claim 4 wherein the nonacid aqueous gel is a methyl cellulose gel.

6. The method of preparing a depilatory formulation comprising adding thioglycollic acid to an aqueous methyl cellulose gel, subsequently adding calcium hydroxide, said thioglycollic acid and said calcium hydroxide being added in quantities sufficient to provide an excess of calcium thioglycollate above that in solution and to provide said formulation with a pH of from about 12 to about 12.6.

References Cited in the file of this patent

UNITED STATES PATENTS 2,199,249     Stoddard _____ Apr. 30, 1940

FOREIGN PATENTS 224,067     Switzerland _____ Feb. 1, 1943
484,467     Great Britain _____ Apr. 27, 1938
543,220     Great Britain _____ Feb. 16, 1942

OTHER REFERENCES

Sindar: "The Story of G–11 (Hexachlorophene), "Drug and Cos. Ind., vol. 67, No. 4, October 1950, pp. 470, 471, 565–570 and 572.

Gregg: "Solubility and Bacterial Studies of Hexachlorophene," J. A. P. A., Sci. Ed., August 1951, pp. 390–393.